United States Patent

[11] 3,610,507

| [72] | Inventor | Jozef Kiwalle<br>Peoria, Ill. |
|---|---|---|
| [21] | Appl. No. | 27,651 |
| [22] | Filed | Apr. 13, 1970 |
| [45] | Patented | Oct. 5, 1971 |
| [73] | Assignee | Caterpiller Tractor Co.<br>Peoria, Ill. |

[54] DRIVE SYSTEM FOR AN INERTIA WELDER
4 Claims, 3 Drawing Figs.

[52] U.S. Cl. .................................................. 228/2,
29/470.3, 91/47, 156/73, 228/8
[51] Int. Cl. ...................................................... B23k 27/00
[50] Field of Search............................................ 228/2;
29/470.3; 156/73; 91/47, 48

[56] References Cited
UNITED STATES PATENTS
| 3,462,826 | 8/1969 | Farmer et al. ................ | 29/470.3 |
| 3,455,494 | 7/1969 | Stamm ....................... | 228/2 |

*Primary Examiner*—John F. Campbell
*Assistant Examiner*—R. J. Craig
*Attorney*—Fryer, Tjensvold, Feix, Phillips & Lempio

ABSTRACT: A hydraulic drive system for accelerating the flywheel of a friction welder to welding speed includes a single pump and a number of constant displacement motors. Each motor is connected to drive the flywheel so long as fluid is supplied to that motor from the pump. The drive system has a valve and manifold arrangement such that fluid is supplied from the pump to the motors in parallel at start up to provide the maximum torque. As the flywheel accelerates, the flow of fluid from the pump to selected ones of the motors is discontinued and is redirected to the remaining motors to provide rapid acceleration with a system that approaches a constant horsepower supply of power.

PATENTED OCT 5 1971
3,610,507
SHEET 1 OF 3
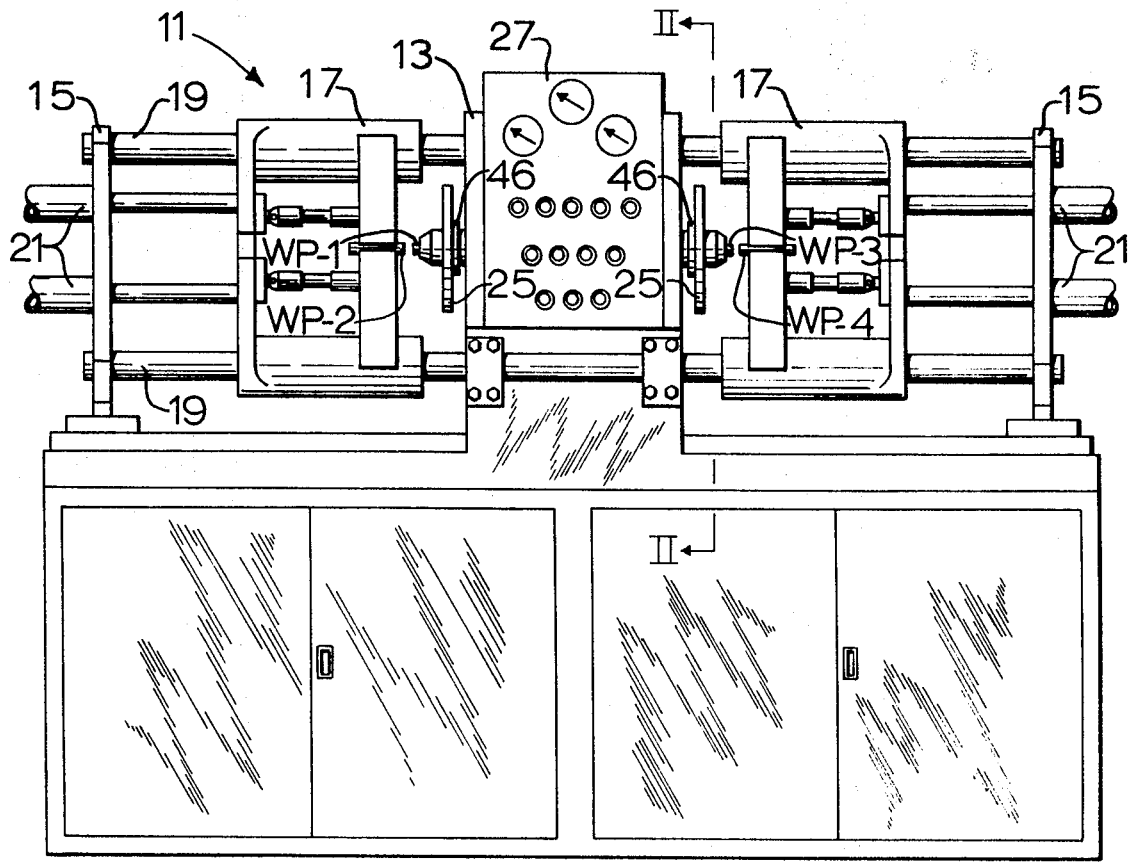
Fig_1.
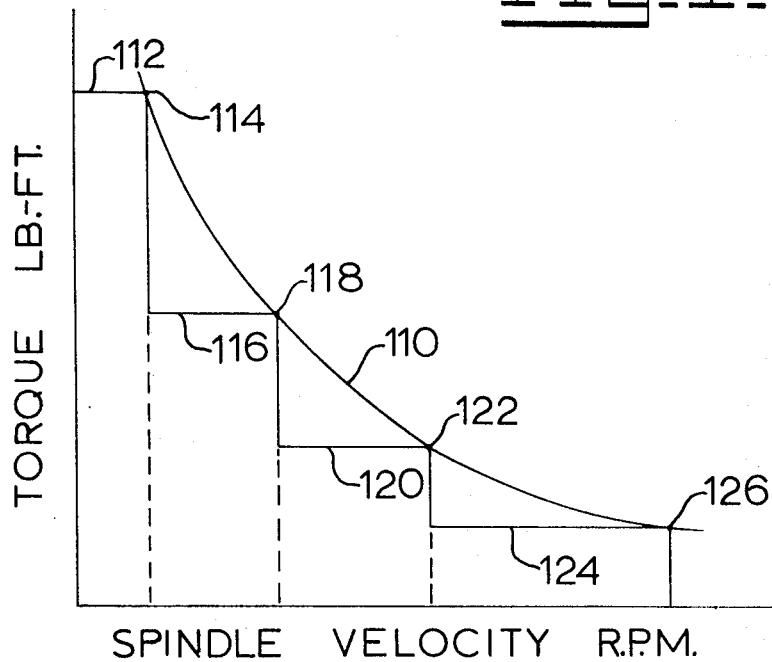
Fig_4.
INVENTOR
Jozef Kiwalle
BY Fryer, Tjensvold, Feix, Phillips & Lempio
ATTORNEYS

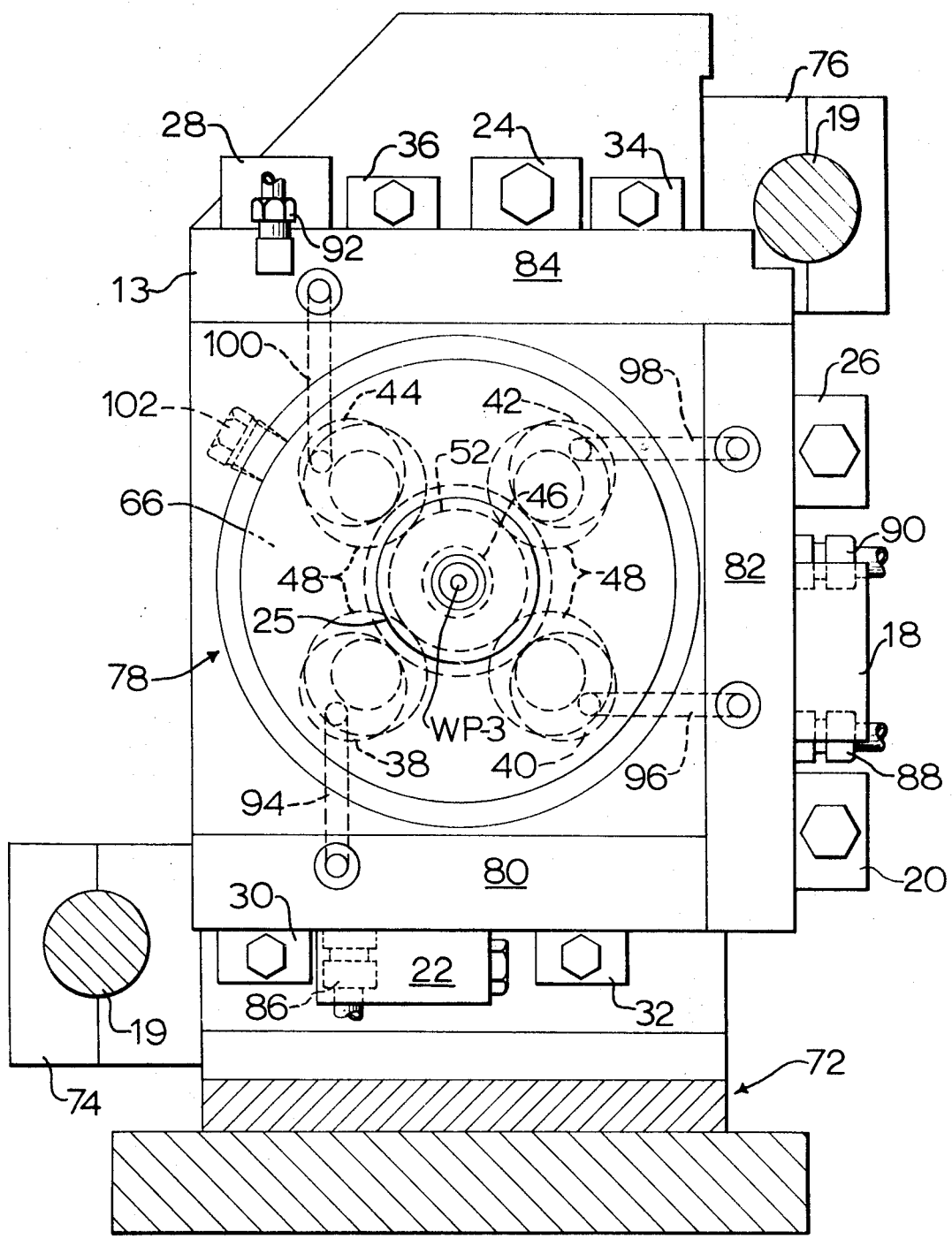
Fig-2-

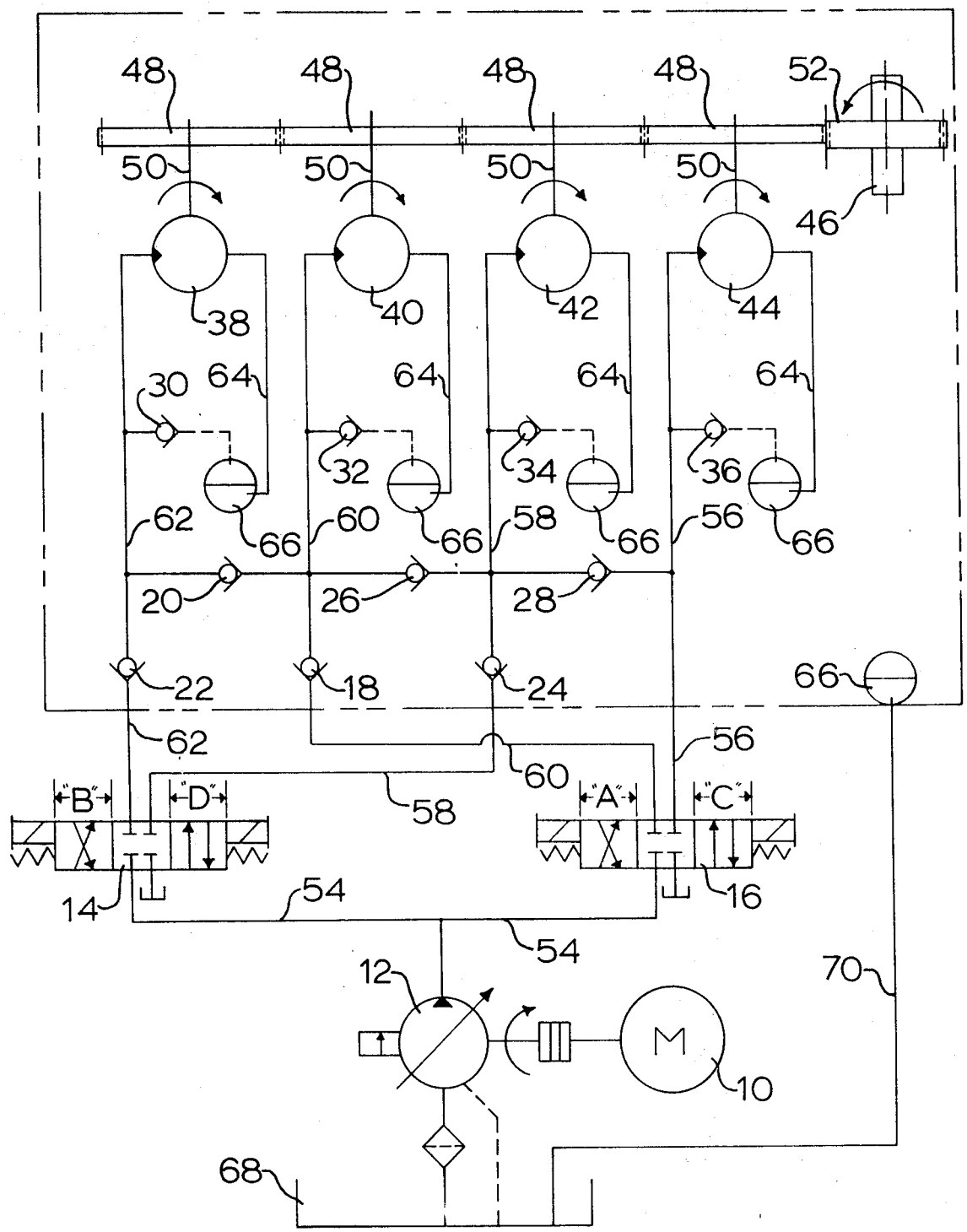
Fig-3-

DRIVE SYSTEM FOR AN INERTIA WELDER

This invention relates to a power and drive system for an inertia friction welding machine. This invention relates specifically to a hydraulic drive system which incorporates a number of constant displacement fluid motors drivingly connected to the spindle for accelerating the spindle and flywheel of the inertia welding machine.

The prior art inertia welding machines with hydraulic drives have used constant torque drives. The constant torque drive produces a fairly slow acceleration rate.

Fast acceleration of the flywheel in inertia friction welding machine is quite desirable. Fast acceleration produces a shorter cycle time. This permits a higher production rate.

Fast acceleration is especially important in the production of relatively small parts since the machines for producing such small parts may be required to have relatively low inertia and relatively high rotational speeds.

A true constant horsepower drive system would be most desirable for producing the desired acceleration rate. However, a true constant horsepower drive system is prohibitive from an economic standpoint.

It is therefore a primary object of the present invention to construct a hydraulic drive system which approaches a constant horsepower supply at a machine cost which is acceptable.

It is a related object to produce such a drive system without the use of a variable displacement fluid motor.

The drive system of the present invention includes a single pump and a number of constant displacement motors. Each motor is connected to drive the flywheel so long as fluid is supplied to that motor from the pump. The drive system has a valve and manifold arrangement such that fluid is supplied from the pump to the motors in parallel at the start of rotation of the flywheel to provide the maximum torque. As the flywheel accelerates, the flow of fluid from the pump to selected ones of the motors is discontinued and is redirected to the remaining motors to provide rapid acceleration with a system that approaches a constant horsepower supply of power. A friction welding machine constructed to incorporate these features and to function in the manner described constitutes further specific objects of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a front elevation view of a friction welding machine incorporating a drive system constructed in accordance with one embodiment of the present invention;

FIG. 2 is an end elevation view taken along the line and in the direction indicated by the arrows II—II in FIG. 1;

FIG. 3 is a schematic of the control arrangement for the drive system; and

FIG. 4 is a graph of torque vs. spindle velocity and shows how the drive system of the present invention approaches a constant horsepower input to the spindle during acceleration of the spindle.

A friction welding machine constructed in accordance with one embodiment of the present invention is indicated generally by the reference numeral 11 in FIG. 1.

The machine 11 is constructed to perform two welds simultaneously. Thus, the machine 11 has a central headstock 13 and two tailstocks 15.

The workpieces to be welded are indicated by the reference characters WP1, WP2, WP3, and WP4. The workpieces or parts WP1 and WP3 are held in chucks at opposite ends of a rotary spindle 46.

The workpieces or parts WP2 and WP4 are held in chucks in nonrotatable fixture assemblies 17.

Tie bars 19 interconnect the tailstocks 15 and provide support for the fixture assemblies 17.

Loading means, in the form of hydraulic rams 21, move the parts WP2 and WP4 into engagement with the parts WP1 and WP3 after these parts have been loaded in their respective chucks, and after the spindle 46 has been accelerated to the desired rotational speed. These loading means thus supply the axial loads for developing the welding pressure.

The friction welding machine shown in FIG. 1 is of the inertia type. All of the energy required for producing the weld is stored as inertial energy in flywheels 25 mounted on the spindle 46 prior to engagement of the parts to be welded by the loading means.

The operator's control panel is mounted on the headstock 13 and is indicated generally by the reference numeral 27.

In accordance with the present invention four constant displacement hydraulic motors are connected to drive the spindle 46.

The motors are indicated by the reference numerals 38, 40, 42 and 44 in FIG. 2 and are connected to drive the spindle 46 through a gear 52 on the spindle and gears 48 on the output shafts of the motors 38, 40, 42 and 44.

FIG. 3 illustrates schematically the drive system for the inertia welding machine spindle.

The main components of the drive system include an electric motor 10, a variable delivery fluid pump 12, two control valves 14 and 16, six one-way check valves 18, 20, 22, 24, 26 and 28, four makeup check valves 30, 32, 34 and 36, four constant delivery fluid motors 38, 40, 42 and 44, and a spindle assembly 46.

The output shaft 50 of each constant delivery fluid motor supports a gear 48, which is coupled to gear 52 of the spindle 46. Although shown in a connected line in the schematic, the gears 48 are actually in a circular pattern and are spaced equally around the circumference of gear 52 of the spindle 46 as shown in FIG. 2.

Each of the control valves 14 ans 16 is a three-position valve and by proper selection of the position of each valve, fluid communication between the variable displacement fluid pump 12 and one or more of the constant displacement fluid motors can be attained. With valves 14 and 16 in the position shown (closed), there is no communication between pump 12 and any of the fluid motors and no power is being transmitted to the spindle 46. The pump 14 would, therefore, be in a null or no delivery position.

If control valve 16 is shifted to the right or to the position "A," communication between pump 12 and all four of the motors is established. As can be seen from FIG. 3, the fluid from pump 12 will flow into line 54, across control valve 16 into line 56, and reach all of the fluid motors by flowing through check valves 28, 26 and 20, to reach lines 58, 60 and 62, which lead directly to the fluid motors. It is evident then that all four of the fluid motors are being powered by pump 12 when control valve 16 is shifted to position "A." Fluid is prevented from flowing in a reverse direction in lines 58, 60 and 62 by the one-way check valves 18, 22 and 24.

If control valve 16 is shifted to a neutral or closed position and control valve 14 is shifted to the right or to the "B" position, communication is established between the pump 12 and the three motors 38, 40 and 42. Fluid will flow from the pump 12 into line 54, across control valve 14, into line 58 and through the one-way check valves 24, 26 and 20, and is thus communicated to motors 38, 40 and 42 by means of lines 62, 60 and 58. Fluid is blocked from line 56 and motor 44 by the one-way check valve 28.

To activate only motors 38 and 40, control valve 14 is shifted to a neutral or closed position, and control valve valve 16 is shifted to the left or position "C." In this position, the fluid from pump 12 flows into line 54, across control valve 16, into line 60, across the one-way check valves 18 and 20, and to motors 38 and 40 by means of lines 62 and 60. Fluid is blocked from motors 42 and 44 by means of the one-way check valve 26.

To activate only motor 38, control valve 16 is shifted to a neutral or closed position, and control valve 14 is shifted to the left or the "D" position. In this position, fluid flows from pump 12 into line 54, across control valve 14, into line 62, across the one-way check valve 22, and pump 38 by means of line 62. The fluid is blocked from motors 40, 42 or 44 by the one-way check valve 20.

All of the constant delivery fluid motors 38, 40, 42 and 44 are contained within a fluidtight chamber, and the fluid leaving each of the motors drains into the sealed chamber. Line 64 represents the fluid draining from each of the fluid motors and shows the fluid flowing into a common chamber 66. This chamber 66 is at atmospheric pressure since it is vented to the outside air by means of a breather (not shown in FIG. 3). In most cases, this chamber will contain a certain proportion of oil and air, with the oil flowing to the bottom of the chamber due to gravity. The oil in chamber 66 will return to the tank 68 by means of a drain line 70.

As shown in FIG. 3, a makeup type of check valve is in communication between the chamber 66 and the inlet lines of each of the four constant delivery fluid motors. The reasons for this will now be explained. Assuming that the pump 12 is operating and the control valve 14 is in position "B," fluid will be supplied to motors 38, 40 and 42, but will not be supplied to motor 44, as previously explained. However, since the gear 48 of motor 44 is still connected to gear 52 of spindle 46, the motor will continue to rotate even though no fluid is being supplied to line 56, which supplies motor 44. In this instance, motor 44 converts to a pump and a partial vacuum is created in line 56. Since one side of check valve 36 is at atmospheric pressure and the other side is at the partial vacuum pressure of the line 56, the check valve 36 will open to equalize the pressures on both sides of the valve. Motor 44 then will begin pumping air and continue pumping air as long as the motor rotates. In most cases, this rotation of motor 44, when no fluid is being supplied to the motor, will be very short and no damage will occur to the internal portions of the motor.

The makeup check valves 30, 32 and 34 operate in the same manner when motors 38, 40 and 42 are shut off from supply of fluid from the pump while the spindle 46 is rotating. When any one, or all, of the fluid motors is shut off from fluid delivery while still connected to the rotating spindle, they will convert to a pump, as previously described, and pump air from the makeup check valves which are connected to the common chamber 66.

The machine illustrated in FIGS. 1 and 2 is a double-ended welder with a hollow spindle so that two welds can be made at the same time. However, the subject drive system can be designed into most any type of inertia welding machine.

As shown in FIG. 2, the inertia welding machine includes a spindle housing base assembly 72, two tie bar brackets 74 and 76, a spindle housing assembly 78, and three manifold assemblies 80, 82 and 84. The six one-way check valves 18, 20, 22, 24, 26 and 28, and the four one-way makeup check valves 30, 32, 34 and 36 are mounted on the three manifold assemblies and cooperate with passages in the manifold assemblies to control flow of fluid to the motors and to vent the motors to atmospheric pressure, as was described with reference to FIG. 3.

The fluid from the pump 12 enters the manifolds for distribution to the motors through fitting assemblies 86, 88, 90, and 92. An inlet port 94 connects motor 38 to manifold 80, a port 96 connects motor 40 to manifold 82, a port 98 connects motor 42 to manifold 82, and a port 100 connects motor 44 to manifold 84. As was explained with reference to FIG. 3, the gear 48 of each motor is in mesh at all times with the spindle gear 52. A breather fitting 102 vents the sealed chamber 66 to the atmospheric pressure, as previously described.

Referring to FIGS. 3 and 2, a typical acceleration sequence, using the subject drive system, would be as follows:

The electric motor 10 and the variable delivery pump 12 would normally be operating, although the pump 12 would be delivering no fluid since the controls would have shifted the pump to a null or zero delivery condition.

To start the acceleration cycle, a control valve assembly 16 is shifted to the "A" position, a demand for fluid is sensed by the controls of pump 12, and the variable displacement portion of the pump increases fluid output to keep up with motor demands. Fluid is delivered by the pump 12 to the control valve 16, then to the three manifold assemblies 80, 82 and 84, and finally reaches each of the motors 38, 40, 42 and 44 through the ports 94, 96, 98 and 100.

All four of the motors are now active and all are driving the spindle through the spindle gear 52. Since the spindle is being driven by the four motors, the starting torque is high and the spindle is accelerated quickly.

When the spindle reaches a predetermined velocity, which matches a fluid demand by the motors that is near the maximum delivery rate of the pump, a speed-sensitive switch (not shown) signals the control valve 16 to shift to the neutral or closed position and at the same time, signals control valve 14 to shift to the "B" position. Motor 44 is then closed off from receiving any fluid from the pump 12 and is vented to atmospheric pressure means of makeup check valve 36.

The other three motors continue to accelerate the spindle 46 to a second predetermined velocity, at which time the speed switch signals control valve 14 to shift to neutral or closed position, and signals control valve 16 to shift to "C" position. Motor 42 and motor 44 are then closed off from communication with the pump 12, and both are vented to atmospheric pressure through the makeup check valves 34 and 36.

Motors 38 and 40 continue to accelerate the spindle 46 to a third predetermined velocity, at which time the speed-sensitive switch signals control valve assembly 16 to shift once again to the neutral or closed position, and signals control valve 14 to shift to the "D" position. This closes off motors 40, 42 and 44 from communication with the pump 12.

At this point only motor 38 continues to drive the spindle 46 to the preselected and predetermined welding velocity. When the spindle reaches this velocity, the speed-sensitive switch signals control valve 14 to shift to a neutral or closed position.

All four motors are then closed off from communication with the pump 12, and all four motors are vented to atmospheric pressure in the chamber 66 through the one-way makeup check valves. At this time, the thrust cylinders are activated and the weld is completed as the spindle comes to a stop.

At the time the last of the four motors is closed off from pump 12, the controls of the pump shift the displacement mechanism of the pump to a null or no displacement position. In this way, the electric motor 10 and pump 12 can continue to operate during the final stages of the weld cycle, during the removal of the completed weld assembly, and during setup for the next weld. It should be emphasized that the entire acceleration cycle is very short and the motor shutdown sequence just described is executed very rapidly.

The use of a variable delivery fluid pump, four fixed delivery fluid motors, and the shutdown sequence simulates or approaches a constant horsepower energy system. The prior art inertia welding machines have used constant torque power drives, which have accounted for fairly slow acceleration rates. A true constant horsepower drive system would be desirable, but is prohibitive from an economic standpoint. The subject drive system represents, therefore, a compromise between machine performance and machine cost.

FIG. 4 illustrates graphically the approach to the constant horsepower energy system. This view shows a plot of torque versus velocity, with a simulated constant horsepower curve 110 drawn in.

The topmost horizontal line 112 represents the starting torque produced by all four motors at the beginning of the acceleration cycle. When the spindle velocity reaches the preselected value represented by point 114 on the graph, one motor is closed off from the pump.

The torque being supplied to the spindle by the three motors then drops to a value represented by line 116 and the three motors then accelerate the spindle to a second preselected value represented by point 118.

A second motor is then closed off from the pump, the torque again drops to the value shown by line 120, and two motors accelerate the spindle to a third velocity shown as point 122.

At this point, the third motor is closed off from the pump and the one remaining motor accelerates the spindle to the preselected maximum speed represented by point 126.

The torque value supplied by the one motor is represented by line 124.

As is evident from the graph of FIG. 4, four distinct torque values are produced during the acceleration cycle. By referring to the constant horsepower curve 110, one can see that the torque along the curve changes slightly as the velocity increases. This is, of course, in contrast to the sharp changes in torque values produced by the four-motor acceleration sequence of the subject drive system. Nevertheless, the subject drive system does approach the constant-horsepower-type system and is more efficient than a constant torque system.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A friction welder of the kind in which two parts to be welded are pressed together in rotating rubbing contact to produce the weld heat and comprising, a rotatable spindle for holding one of the parts, a flywheel mounted for rotation with the spindle for storing the energy required to produce the weld, a nonrotatable fixture for holding the other part to be welded, loading means for moving the parts into engagement under welding pressure after the spindle and flywheel have been accelerated to the desired rotational speed, and hydraulic drive means for accelerating the spindle and flywheel to the desired rotational speed, said hydraulic drive means including a plurality of constant displacement fluid motors each connected in drive relation to the spindle, a pump connected to supply fluid to the motors, and control means for supplying fluid from the pump in parallel to all of the motors at the start of rotation of the spindle and for sequentially discontinuing the supply of fluid to selected ones of the motors as the spindle is accelerated to thereby approach a constant horsepower supply of power to the spindle for rapid acceleration of the spindle.

2. A friction welder as defined in claim 1 wherein the control means include a control valve and manifolds between the pump and the motors for discontinuing the flow of fluid to one motor and directing that flow of fluid to another motor.

3. A friction welder as defined in claim 2 including a first group of one-way check valves in the manifold and actuated by movement of the control valve to close off the flow of fluid from the pump to said one motor.

4. A friction welder as defined in claim 3 including a second group of one-way check valves in the motor inlet manifolds which open to vent the inlet to atmospheric pressure when the first group of check valves for said one motor are closed.